United States Patent [19]

Rovigo

[11] 4,313,781

[45] Feb. 2, 1982

[54] METHOD AND APPARATUS FOR CUTTING AND SEALING THERMOPLASTIC MATERIAL

[75] Inventor: Luis Rovigo, Flushing, N.Y.

[73] Assignee: Ro-Ann Industries Corporation, Maspeth, N.Y.

[21] Appl. No.: 163,412

[22] Filed: Jun. 26, 1980

[51] Int. Cl.[3] .......................... B32B 31/00; B31B 1/14

[52] U.S. Cl. .................................... 156/530; 156/510; 156/269; 156/583.1; 493/372; 53/562; 226/49; 226/143

[58] Field of Search ....................... 156/583.5, 90, 289, 156/250, 510, 530, 251, 515, 583.1, 252, 269; 93/33 H, DIG. 1; 493/372, 470, 376; 53/562; 226/143, 49, 50, 51

[56] References Cited

U.S. PATENT DOCUMENTS

| | | | |
|---|---|---|---|
| 3,607,573 | 9/1971 | Michaelides | 156/515 |
| 3,616,042 | 10/1971 | Beyer | 156/583.5 |
| 3,729,359 | 4/1973 | Monsees | 156/583.5 |
| 4,019,947 | 4/1977 | Stock et al. | 156/515 |
| 4,101,369 | 7/1978 | Adams | 156/583.5 |
| 4,105,489 | 8/1978 | Lotto | 156/510 |
| 4,131,503 | 12/1978 | Plate | 156/510 |

*Primary Examiner*—Edward C. Kimlin
*Assistant Examiner*—L. Falasco
*Attorney, Agent, or Firm*—Steinberg & Raskin

[57] ABSTRACT

Method and apparatus for cutting and sealing a two-ply web of thermoplastic material of tubular, flexible stock includes a sheet member formed of a non-stick material interposed between an intermittently advancing web of thermoplastic material and a sealing pad, and apparatus for moving the non-stick sheet member in the downstream direction subsequent to a blade severing the web downstream from the sealing pad and a heated sealing member sealing the plies of the portion of the web which overlie the sealing pad while the web is at rest between intermittent advancements thereof, so that any portion of the sealed portion of the web which may have become stuck to the sheet member is stripped therefrom.

11 Claims, 6 Drawing Figures

METHOD AND APPARATUS FOR CUTTING AND SEALING THERMOPLASTIC MATERIAL

BACKGROUND OF THE INVENTION

This invention relates generally to methods and apparatus for use in bag-making machines for manufacturing bags of thermoplastic material and, more particularly, to such methods and apparatus adapted for the manufacture of bags which are formed from tubular webs of thermoplastic material with the completed bag structure having a thermally welded seal and an open top. Still more particularly, the present invention relates to such methods and apparatus whereby any portion of the thermoplastic web which may have become bonded during the sealing operation to the apparatus is stripped therefrom to avoid the possibility of the web adhering to the machine during operation.

Various techniques have been proposed for bottom seal bag-making machines which generally utilize means for intermittently advancing a web of thermoplastic material of tubular, flexible stock and wherein while the web is at rest between intermittent advancements thereof, the web is held under tension whereupon a blade is reciprocated to cut the web and a heated sealing bar then reciprocated to seal the plies of the web at a portion which overlies a sealing pad to thereby form the bottom-seal of the bag.

It has been recognized that during the sealing operation described above, it is not uncommon for the sealed portion of the web to become bonded to the sealing pad of the machine at least to some extent. Such bonding or adherence of the bottom-seal to the sealing pad has severely inhibited the smooth operation of the machine in that when the draw rollers are actuated to further advance the web into position for the next cutting and sealing operations, the bottom-seal so formed constitutes the leading edge of the web being advanced and should the same have become bonded to the sealing pad, the web will not advance but, rather will become bunched up in the region of the sealing pad thereby requiring the machine to be shut down to remedy the situation. Of course, such periods of down time for these high-speed machines are quite costly.

Several attempts have been made to overcome the problems described above. For example, in machines exemplified by those disclosed in U.S. Pat. No. 4,101,369 assigned to G. T. Schjeldahl Company and 4,105,489 assigned to F. M. C. Corporation, methods and apparatus are provided wherein subsequent to the web being transversely severed and the seal bars sealing the web along a margin which defines the bottom of the bag, the web is momentarily fed rearwardly or retracted to strip any portion of the web which may have become bonded to the seal bars during the sealing operation.

However, such techniques which incorporate a reversal in the direction of feed of the web are not entirely satisfactory. Thus, such arrangements tend to result in a weak seal being formed and, in some cases, the bottom-seal is torn during the reversal of the direction of the web. Further, the skirt portion of the web is often curied by this action. Since the reversal of the direction of feed of the web incorporated in such techniques generally require the use of a clutch which reverses the direction of the draw rolls and associated elements of the machine, undue stresses are exerted on the mechanical train of the bag-making machine which contribute to early failure thereof.

Other arrangements have been suggested to overcome the problem of the bottom-seal adhering or bonding to the sealing structure of the bag-making machine. For example, U.S. Pat. No. 4,131,503 discloses a technique for cutting and sealing thermoplastic material wherein the thermoplastic web is advanced over a sealing roll having a Teflon covering whereupon the web, under tension, is severed and the bottom-seal formed through movement of a sealing bar against the web which overlies the sealing roll. However, this arrangement has not overcome the problems described above since the bottom-seal formed during the sealing operation still tends to bond or adhere to the sealing roll to inhibit the further advancement of the web.

SUMMARY OF THE INVENTION

Accordingly, one object of the present invention is to provide a new and improved method and apparatus for cutting and sealing a web of thermoplastic material of tubular, flexible stock which overcomes the problems described above.

Another object of the present invention is to provide new and improved methods and apparatus for preparing bottom-seal bags formed of tubular webs of thermoplastic material with the completed bag structure having a thermally welded bottom seal and an open top.

Still another object of the present invention is to provide new and improved methods and apparatus for preparing bottom-seal bags formed of tubular webs of thermoplastic material wherein subsequent to the cutting and sealing operations being accomplished, any portion of the web which may have become bonded or which may adhere to elements of the machine due to the sealing operation will be stripped therefrom to allow an uninhibited further advancement of the web during the bag-making operation.

Briefly, in accordance with the present invention these and other objects are attained by providing a method and apparatus wherein a tubular web of thermoplastic material is intermittently advanced in a downstream direction so that while the web is at rest between intermittent advancements thereof, a portion of the web extending transversly to the downstream direction and which will be subjected to a sealing operation to form the bottom-seal of the bag, overlies a sealing pad. With the web being maintained under tension, a transversely extending blade is reciprocated to cut the web at a location slightly downstream of the sealing pad whereupon a heated sealing bar is reciprocated to seal the plies of the web immediately after the cutting operation to form the bottom-seal at the portion of the web which overlies the sealing pad. According to the invention, a non-stick sheet member is located over the sealing pad so as to be interposed between the sealing pad and the web. Immediately after the bottom-seal is formed as described above, and with the web being held stationary, the non-stick sheet member is moved in a downstream direction to strip any portion of the web which may have become bonded or adhered to the sheet material during the sealing operation.

In the illustrated preferred embodiment, the non-stick sheet material comprises an endless loop of sheet material having a portion which overlies the sealing pad. Immediately subsequent to each sealing operation, the loop is reciprocated by suitable apparatus whereby the portion of the sheet material normally overlying the sealing pad moves in a downstream direction so that the adhering bottom-seal is stripped therefrom and then moved in a reverse direction back to its original position in preparation for the next sealing operation.

The non-stick sheet material may comprise a glass-coated fabric, a Teflon coated fabric, or any other flexible material which tends to resist the bonding of thermoplastic material thereto.

From the foregoing, it is seen that the various problems inherent in the prior art arrangements are overcome. Thus, the direction of movement of the web is always in a downstream direction, i.e., there are no reversals of the direction of draw of the web so that a clean, strong seal and well formed skirt are obtained. Additionally, since no reversals of the mechanical drive train of the bag machine are required, the apparatus will tend to resist failure for longer period of time than those apparatus wherein a reversal in the direction of web movement is provided. Since the web is held stationary during the stripping operation, any possibility of the web remaining adhered or bonded to the machine is eliminated.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which.

DESCRIPTION OF THE PREFERRED EMBODIMENTS

Figure 1:
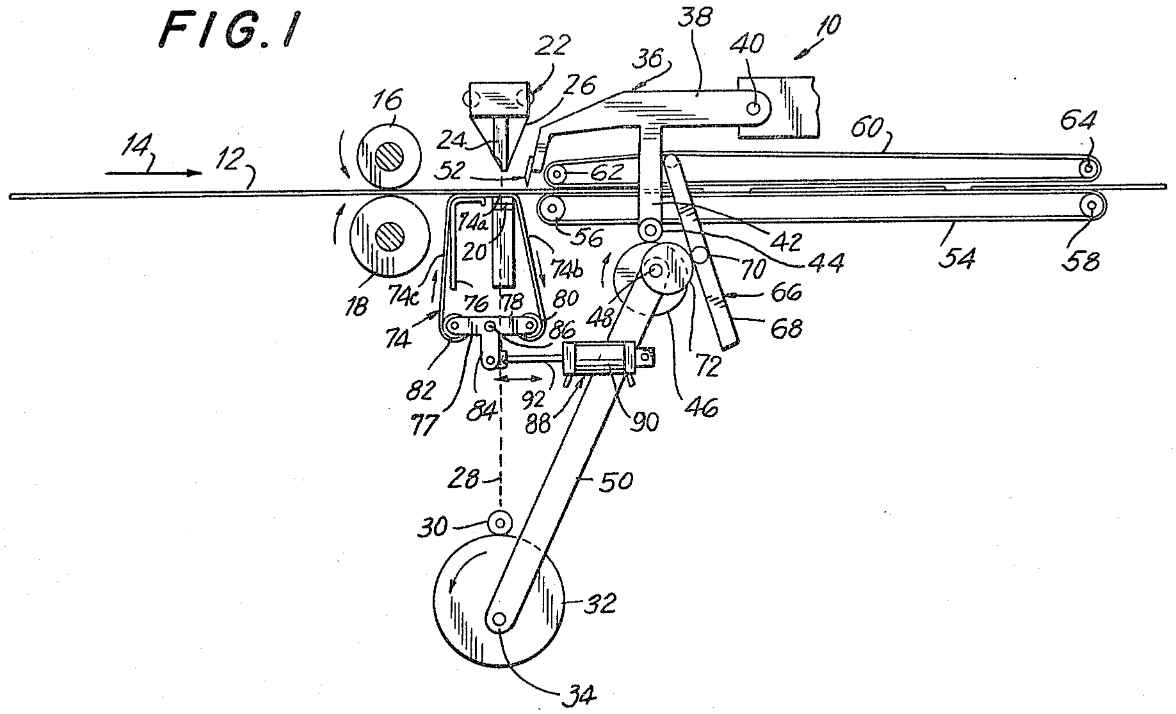
FIG. 1 is a schematic side elevation view of apparatus incorporating the improvement of the present invention for performing the method of the present invention.

Referring now to the drawings wherein like reference characters designate identical or corresponding parts throughout the several views and, more particularly, to FIG. 1, apparatus, generally designated 10, for manufacturing bottom-seal bags from tubular webs of thermoplastic material and incorporating the improvement of the present invention is illustrated. A web 12 of tubular, flexible thermoplastic material such, for example, as polyethylene, polypropolyne and the like, is drawn in the direction of arrow 14, i.e., in a downstream direction, between upper and lower draw rollers 16, 18. Thus, the upper draw roller may comprise an idler roller whose position is vertically adjustable while the lower draw roller 18 comprises a drive roller connected to a suitable drive motor and clutch-brake assembly (not shown), the latter being entirely conventional. For example, the drive arrangement illustrated in U.S. Pat. No. 4,101,369 may be utilized.

A sealing pad 20 is located in downstream alignment with the nip defined between the draw rollers 16, 18 and has a heat resistant surface formed of any suitable heat-resistant material such as polytetrafluoroethylene (Teflon). The sealing pad 20 extends transversely to the direction of draw 14 of web 12 over substantially the entire width of web 12. Thus, sealing pad 20 is arranged so that as the web 12 is advanced in the downstream direction as indicated by arrow 14, portions thereof will be located over the sealing pad 20.

A sealing bar assembly 22 is mounted vertically over the sealing pad 20 and is adapted to vertically reciprocate to contact the portion of web 12 located over sealing pad 20 when the web 12 is at rest between the intermittent advancements thereof. The sealing bar assembly 22 comprises a heated bar 24 covered by a glass cloth 26. The reciprocation of the sealing bar assembly 22 is accomplished by means of a lifting arm, schematically illustrated as 28, the upper end of which is affixed to the sealing bar assembly 22 and the lower end of which has a cam follower 30 rotatably mounted thereon which engages a continuously rotating cam 32 which is affixed to the main drive shaft 34 of the machine. In this manner, the sealing bar assembly 22 is continuously reciprocated in the vertical direction as the main drive shaft 34 of the machine rotates.

Immediately downstream from and adjacent to the sealing bar assembly 22 is cutter blade assembly 36 which includes a body member 38 which is pivotally mounted about a pin 40 in the machine frame. A leg 42 depends downwardly from the upper portion of body member 38 and carries at its lower end a cam follower 44 which is arranged to ride upon the surface of a cam 46. The cam 46 is mounted on a shaft 48 which itself is driven by the main drive shaft 34 through appropriate flexible drive means, such as a chain 50. A cutter blade 52 is mounted at the free end of body member 38 and extends transversly to the direction of advancement of web 12 over substantially the entire width of the web. The cutter blade 52 is arranged on the body member 38 such that rotation of cam 46 results in a reciprocation of the cutter blade 52 whereby when the web 12 is at rest between intermittent advancements thereof, the cutter edge of blade 52 will sever the web. Thus, as is apparent from the drawings, as the main drive shaft 34 rotates the sealing bar assembly 22 and cutter blade 52 are reciprocated in synchronism with each other. More particularly, the cams 32, 46 and cam followers 30, 44 as well as the associated components of the sealing bar and cutter blade assemblies 22, 36 are arranged so that when the web 12 is at rest between intermittent advancements thereof, the cutter blade 52 will sever the web whereupon substantially immediately thereafter, the heated bar 24 of the sealing bar assembly 22 will contact the portion of the web overlying the sealing pad 20 to heat seal the plies of web 12 together to form the bottom-seal.

Downstream of the sealing and cutting assemblies is an endless delivery belt 54 which is trained about rollers 56,58 which is adapted to pick off the sealed and cut articles from the pad 20 and transport the same to a collection rack (not shown). An upper endless belt 60 is trained about rollers 62, 64, roller 62 being itself mounted on a rocking frame 66. A leg 68 depends from the upper portion of frame 66 and has a cam follower 70 mounted thereon which engages the surface of a cam 72 fixed to shaft 48. The rocking frame 66 is pivotally mounted to the frame of the machine so that as shaft 48 rotates, the rocking frame 66 reciprocally pivots so that the roller 62 intermittently contacts the upper surface of web 12. The cam 72, the cam follower 70 and the rocking frame 66 are appropriately dimensioned so that the roller 62 will be urged into contacting relation with the upper surface of web 12 during the draw cycle and during the cutting cycle in order to assist in moving the leading edge of the web along the conveyor structure and in order to maintain tension during cutting.

All of the structure described above is generally conventional and reference is made, for example, to U.S. Pat. No. 4,101,369 in this connection.

According to the present invention, an endless loop 74 of flexible non-stick material such, for example as Teflon coated or glass cloth, is provided around the sealing pad 20 in a manner such that a portion thereof is interposed between the pad 20 and the web 12. Thus, in the illustrated preferred embodiment, a loop 74 of Teflon coated fabric material having a width substantially equal to the width of web 12 extends around the sealing pad 20 and has a portion **74*a* located directly over the sealing pad 20. A right-angle bracket 76 is located rearwardly of sealing pad 20 and has one leg substantially co-planar therewith and the other leg extending downwardly therefrom. The flexible non-stick material 74 is further defined by forward and rearward portions 74*b*, 74*c*, respectively, portion 74*a*** being intermediate to the forward and rearward portions.

Apparatus is provided for reciprocating the portion **74*a* of the non-stick material 74, first forwardly, i.e., in the direction 14 of draw of web 12, and then rearwardly back to its original position. In the illustrated embodiment, such apparatus comprises a bellcrank member 77 including an elongate portion 78 having rollers 80, 82 mounted on its ends which engage the ends of the forward and rearward portions 74*b*, 74*c*, respectively, of the flexible non-stick material 74. A depending leg portion 84 of bellcrank member 77 extends downwardly from the elongate portion 78 thereof, the bellcrank member 77 being pivotally mounted to the frame of the machine about a pin 86**.

An air actuated piston-cylinder assembly 88 is provided, the cylinder 90 being pivotally affixed to the machine frame while the free end of the piston 92 is pinned to the lower end of leg portion 84 of bellcrank member 76. The piston-cylinder assembly 88 is actuated by means of appropriate circuitry so that the piston 92 is moved outwardly of cylinder 90 immediately after the sealing operation is completed.

Actuation of the piston-cylinder assembly results in a clockwise movement of the bellcrank member 77 (as seen in FIG. 1) whereby the forward portion **74*b* of the non-stick sheet material is pulled downwardly resulting in a forward movement of the intermediate portion 74*a* thereof. The piston 92 is then withdrawn back into the cylinder 90 resulting in a counterclockwise movement of the bellcrank member 76 about pin 86 so that the rearward portion 74*c* of the non-stick material 74 is pulled downwardly so that the intermediate portion 74*a* returns to its original position over sealing pad 20**.

The movement of the flexible non-stick material 74 is accomplished while the web 12 is held stationary between the draw rollers 16, 18, i.e., draw rollers 16, 18 are in their non-rotating mode while the piston-cylinder assembly 88 is actuated as described above. In this manner any portion of the web 12 which has been sealed through the action of the sealing bar assembly 22 which may have become bonded or adhered to the non-stick material 74 will be stripped therefrom when the latter is moved in the direction of advancement 14 of web 12.

Figure 2:
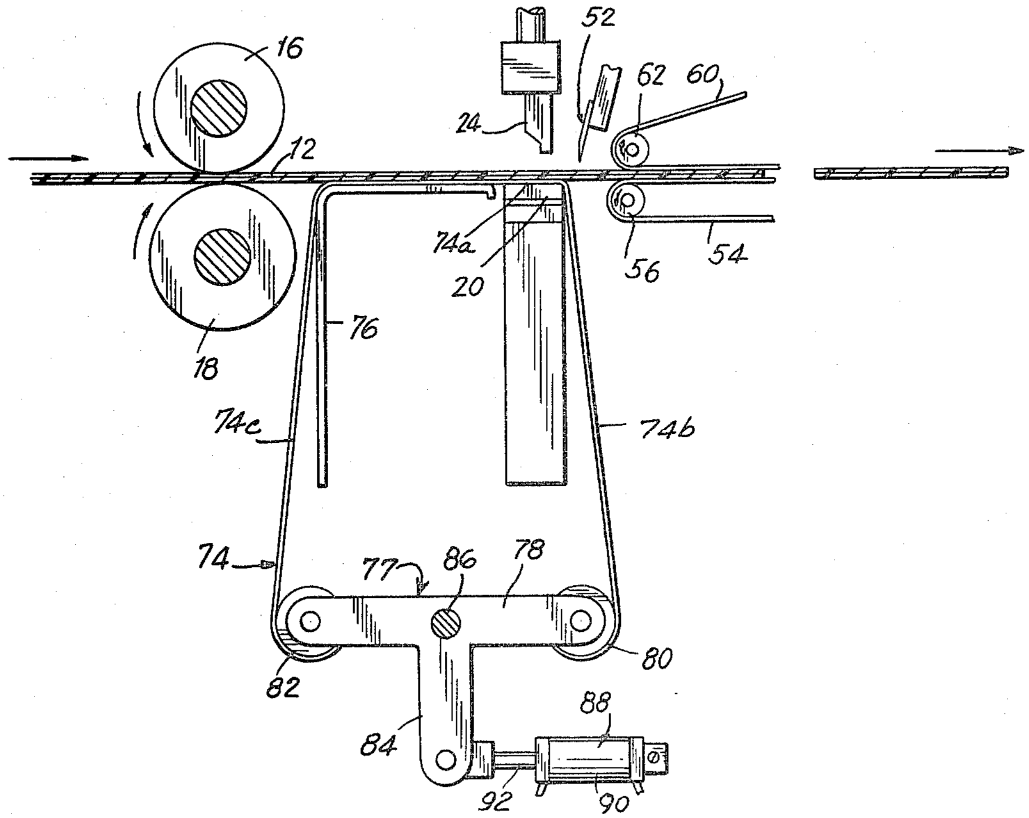
FIG. 2 is a schematic view of the elements illustrated in FIG. 1 and showing the apparatus with the thermoplastic stock material under tension immediately prior to severing or cutting the same.

The operation of the method and apparatus of the invention will now be described in conjunction with FIGS. 2–6. FIG. 2 illustrates the apparatus just prior to cutter blade 52 severing the web 12. At this time, the web is maintained under tension by means of pick off roller 62 being in its engaged position, i.e., contacting the upper surface of web 12, so that rotation of rollers 56, 62 causes a pulling action on web 12 which is held against movement by draw rollers 16, 18 which are stationary. It is noted that the portion of the web to be sealed by the heated bar 24 to form the bottom-seal, is located over portion **74*a* of the flexible non-stick material 74. It is also noted that the operations to be described all occur while the web 12** is at rest, i.e., between intermittent advancements thereof.

Figure 3:
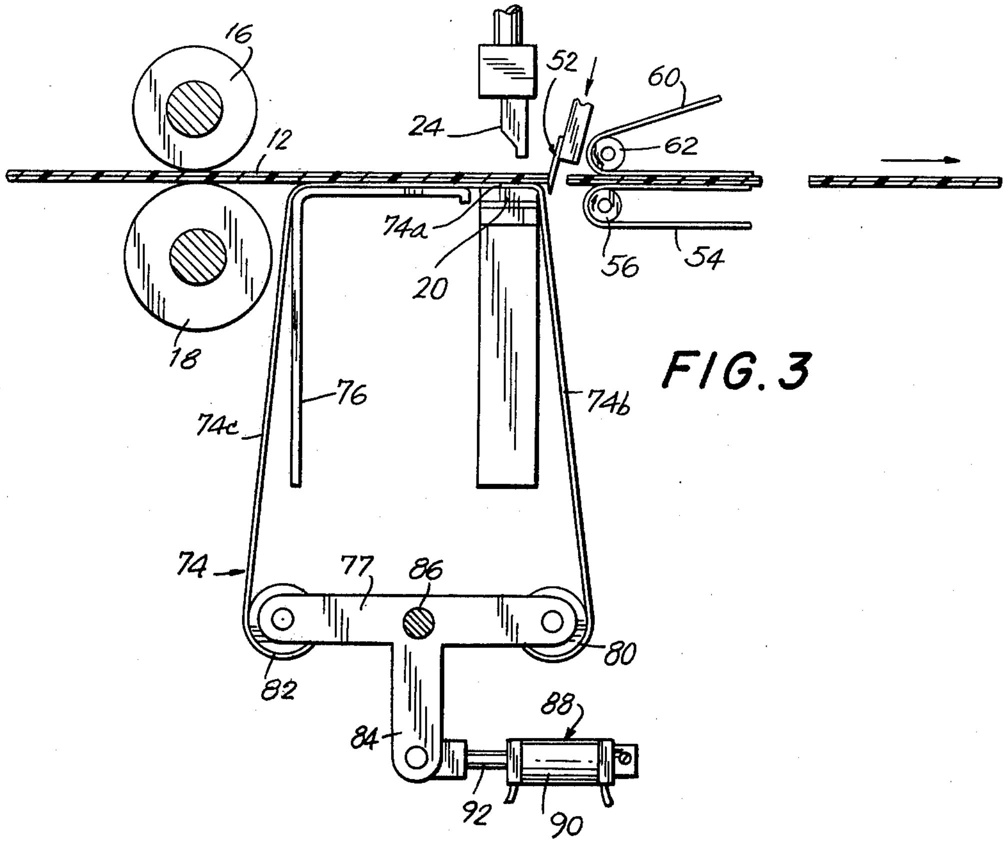
FIG. 3 is a view similar to FIG. 2 at the time of severing.

Referring now to FIG. 3, the cutter blade 52 descends to sever the web 12 transversely across its entire width while the web is under tension as described above and the newly formed bag is withdrawn from the machine for stacking by the coveyor belts 54, 60.

Figure 4:
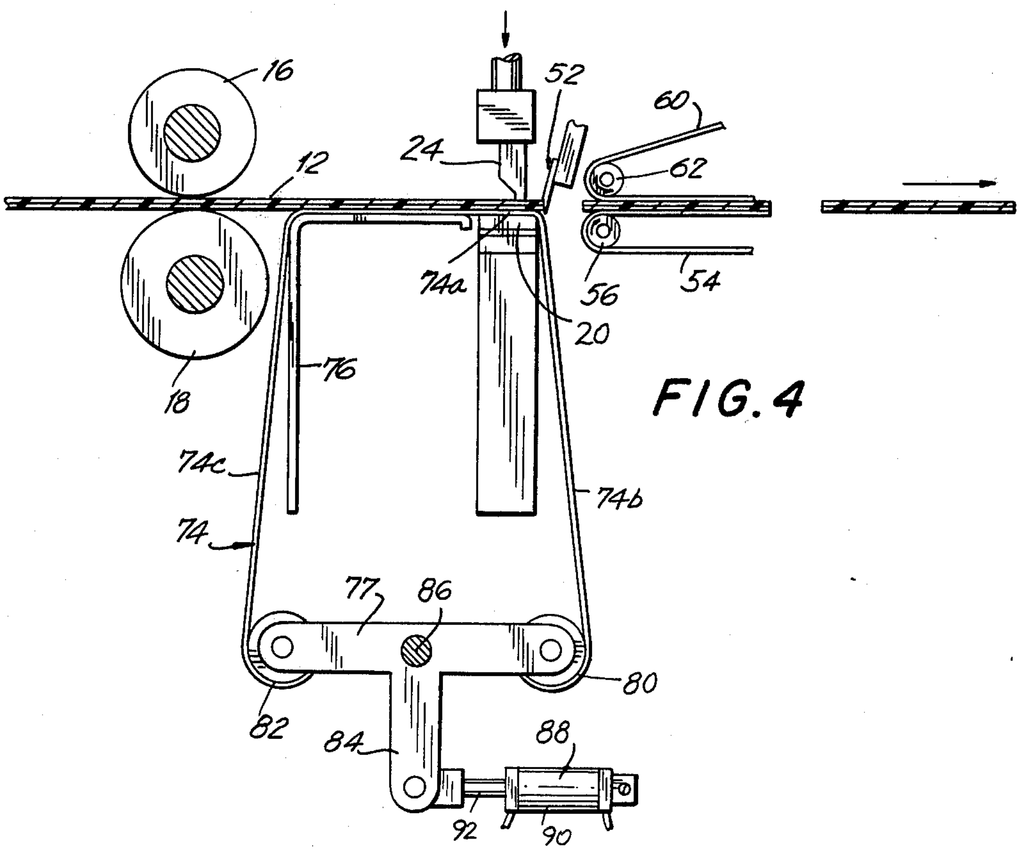
FIG. 4 is a view similar to FIG. 2 immediately after severing during heat sealing of the thermoplastic web.

Referring to FIG. 4, the heated sealing bar is reciprocated downwardly by the lifting arm 28 and the two plies of the web 12 are heat sealed together at the newly severed edges thereof to form a bag bottom. It is noted that the heated bar 24 urges the web 12 against the portion **74*a* of the non-stick material 74 located over the sealing pad 20**. The temperature of the sealing bar is maintained in the range of about 300° to about 600° F., preferably about 450° F., to effectively weld the sides of the thermoplastic stock material together.

Figure 5:
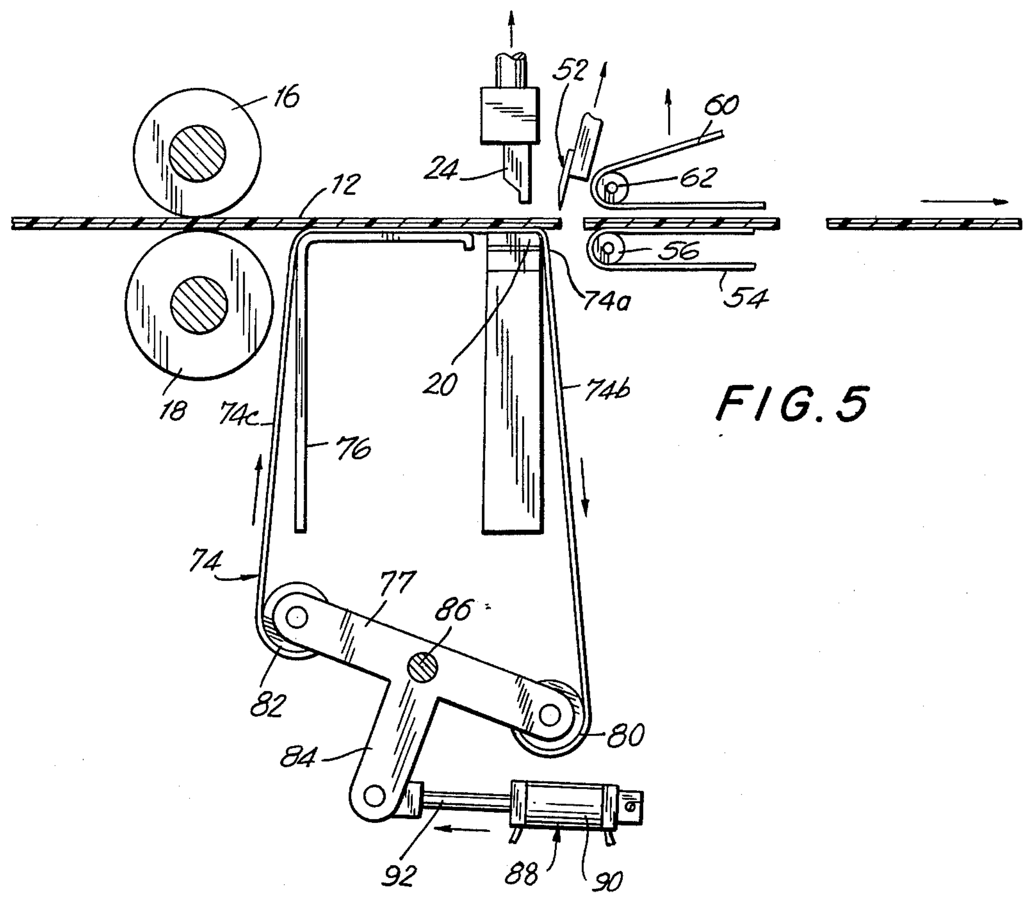
FIG. 5 is a view similar to FIG. 2 illustrating the stripping operation wherein the portion of the web which may have been adhered or bonded to the machine is stripped therefrom.

As noted above, problems have arisen in the past during the sealing operation described immediately above in that the heat sealed thermoplastic material has tended to adhere or become bonded to the abutting surface (sealing pad or sealing roller). In the present case, portions of the sealed edges of the thermoplastic material tend to become bonded or adhere to the portion **74*a* of the non-stick material 74. Referring to FIG. 5, immediately subsequent to the sealing operation, the piston-cylinder assembly 88 is actuated whereupon the piston 92 moves outwardly from the cylinder 90 thereby rotating the bellcrank member 77 in a clockwise direction as seen in FIG. 5. In this manner, the forward portion 74*b* is pulled downwardly so that the intermediate portion 74*a* first moves in the direction of draw of the web 12 over the edge of the sealing pad 20 to follow the downward direction in which the forward portion 74*b* is pulled. In this manner, any portion of the heat sealed web 12 which may have adhered or bonded to the portion 74*a* is stripped therefrom. It is noted that the web 12 is held stationary between the nips of draw rollers 16, 18 which remain stationary during this operation. Further, the pick up roller 62 has ascended to the position illustrated in FIG. 5. At this time, the piston-cylinder assembly 88 is again actuated to withdraw the piston 92 within cylinder 90 to return the bellcrank member 77 to its original position thereby returning the intermediate portion 74*a* of the non-stick material to its original position on the sealing pad 20**.

Figure 6:
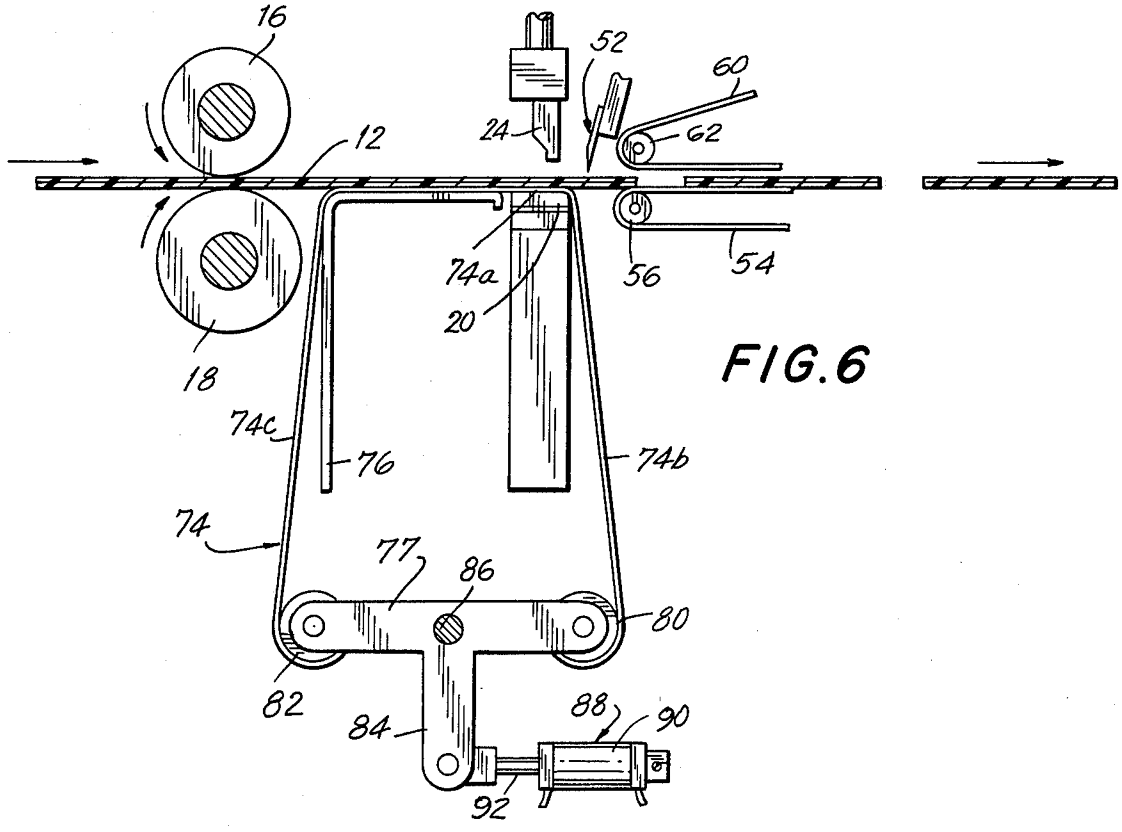
FIG. 6 is a view similar to FIG. 2 during advancement of the thermoplastic web preparatory to the next severing operation.

Finally, referring to FIG. 6, the draw rollers 16, 18 are actuated to advance the web 12 in the direction of draw through a distance equal to the depth of the bag being manufactured. Thus, a portion of the web 12 in which the next bottom-seal is to be formed is then located over the sealing pad 20 for subsequent cutting and sealing operations.

From the foregoing, it is seen that the present invention provides a technique whereby portions of the web which may have become bonded or adhered to the machine during the sealing operation are reliably stripped therefrom. Since the non-stick material 74 is first moved in the direction of draw of the web 12 to accomplish the stripping, a clean, strong seal is obtained and a straight skirt is assured.

Obviously, numerous modifications and variations of the present invention are possible in the light of the above teachings. For example, the non-stick material may be provided in forms other than in a continuous loop. For example, the non-stick material may be a single strip of material whose ends are fastened to the elongate portion 78 of bellcrank member 77. However, it is desirable for the non-stick material to be provided in the form of the loop since it is then possible to index the loop forwardly while the machine is not in operation so that a new portion 74*a* is located over the sealing bar 20 when the initial portion becomes worn. Further, the means for reciprocating the non-stick material 74 may be other than the bellcrank member illustrated and the apparatus for actuating the bellcrank need not necessarily comprise a air operated piston-cylinder arrangement. Still further, it is within the scope of the present invention to index the non-stick material 74 forwardly in an intermittent manner rather then reciprocating the same as disclosed above in connection with the illustrated preferred embodiment. Thus, the non-stick material 74 may be provided in the form of a closed loop and a friction wheel located within the loop which is actuated in the same direction with each cycle of the machine. Further, the method and apparatus of the present invention can be applied to other then bottom-seal machines, e.g., to side seal bag machines.

It is therefore to be understood that within the scope of the appended claims, the invention may be practiced otherwise then as specifically disclosed herein.

What is claimed is:

1. In cutting and sealing apparatus for use in a bag-making machine of the non-continuous type for manufacturing bags from a two-ply web of thermoplastic material of tubular flexible stock, including:

means for intermittently advancing the web in a downstream direction;

a sealing pad extending transversly to said downstream direction, said advancing means being adapted to intermittently advance the web until a portion thereof overlies said sealing pad while the web is at rest between intermittent advancements thereof;

means for applying tension to said web while the web is at rest;

a blade member extending transversly to the downstream direction over the width of the web and mounted for reciprocal movement onto and away from the web;

means for reciprocating said blade member when the web is at rest to sever the web downstream from said sealing pad;

a heated sealing member extending transversly to said downstream direction over said sealing pad and mounted for reciprocal movement toward and away from said sealing pads;

means for reciprocating said sealing member when the web is at rest to seal the plies of the web at the portion thereof which overlies the sealing member;

the improvement comprising:

a sheet member, at least a portion of which is formed of a non-stick material, located over said sealing pad so as to be interposed between the web and sealing pad; and means for moving said non-stick sheet member in the downstream direction subsequent to said cutting and sealing steps and while the web is at rest to strip any portion of the sealed portion of the web which may have been bonded thereto during the sealing operation.

2. The combination of claim 1 wherein said means for moving said non-stick sheet member comprises means for reciprocating the same so that the sheet member undergoes movement through a predetermined distance in the downstream direction and then undergoes movement in the reverse direction to return to its original position.

3. The combination of claim 1 wherein said sheet member comprises a length of non-stick sheet material, an intermediate portion of which normally overlies said sealing pad, said sheet material also having forward and rearward portions which extend downwardly from respective upstream and downstream edges of the sealing pad.

4. The combination of claim 3 wherein said means for moving said non-stick sheet member comprises means for reciprocating the same so that said portion of said sheet member which overlies said sealing pad undergoes movement through a predetermined distance in the downstream direction and then undergoes movement in the reverse direction to return to its original position.

5. The combination of claim 2 wherein said means for moving said non-stick sheet member comprises means engaging respective forward and rearward portions thereof for pulling said forward portion downwardly to move said intermediate sheet portion in the downstream direction and then for pulling said rearward portion downwardly to move the intermediate portion in the reverse direction.

6. The combination of claim 5 wherein said means for moving the non-stick sheet member comprises an elongate member having end portions engaging said respective forward and rearward portions of said length of non-stick sheet material, said elongate member being pivotally mounted, and means for reciprocally pivoting said elongate member.

7. The combination of claim 6 wherein said means for reciprocally pivoting said elongate member comprises a piston-cylinder apparatus, said piston being attached to said elongate member.

8. The combination of claim 6 wherein each of said end portions of said elongate member has a roller pivotally mounted thereon, said loop of non-stick sheet material being engaged by said rollers.

9. The combination of claim 8 wherein said non-stick material comprises a glass coated fabric material.

10. The combination of claim 8 wherein said non-stick material comprises a Teflon coated fabric material.

11. The combination of claim 1 wherein said sheet member comprises an endless loop of non-stick sheet material.

* * * * *